(12) United States Patent
Lipsker

(10) Patent No.: US 11,467,557 B2
(45) Date of Patent: Oct. 11, 2022

(54) CNC SYSTEM AND APPARATUS

(71) Applicant: Daniel Lipsker, Katzir (IL)

(72) Inventor: Daniel Lipsker, Katzir (IL)

(*) Notice: Subject to any disclaimer, the term of this patent is extended or adjusted under 35 U.S.C. 154(b) by 52 days.

(21) Appl. No.: 16/995,944

(22) Filed: Aug. 18, 2020

(65) Prior Publication Data

US 2021/0132574 A1 May 6, 2021

(30) Foreign Application Priority Data

Aug. 18, 2019 (IL) .......................................... 268749

(51) Int. Cl.
| | | |
|---|---|---|
| *B21J 11/00* | (2006.01) | |
| *G05B 19/402* | (2006.01) | |
| *G05B 19/18* | (2006.01) | |
| *B25H 1/08* | (2006.01) | |
| *B25H 1/02* | (2006.01) | |
| *B23Q 1/25* | (2006.01) | |

(52) U.S. Cl.
CPC ............. *G05B 19/402* (2013.01); *B23Q 1/25* (2013.01); *B25H 1/02* (2013.01); *B25H 1/08* (2013.01); *G05B 19/182* (2013.01)

(58) Field of Classification Search
CPC ... B23Q 1/25; B25H 1/02; B25H 1/08; B25H 1/12; B25H 1/0021
USPC ..................... 72/404, 405.09, 405.15, 405.16
See application file for complete search history.

(56) References Cited

U.S. PATENT DOCUMENTS

| | | | |
|---|---|---|---|
| 6,520,227 B2* | 2/2003 | McFarlin, Jr. ............ | B27C 5/02 |
| | | | 144/135.2 |
| 2009/0302517 A1* | 12/2009 | Patel ......................... | B25B 1/22 |
| | | | 269/71 |
| 2012/0152069 A1* | 6/2012 | Hyatt ...................... | B23B 3/065 |
| | | | 82/1.11 |
| 2018/0308014 A1* | 10/2018 | White .................. | G06N 99/007 |

* cited by examiner

*Primary Examiner* — Joseph J Hail
*Assistant Examiner* — Shantese L McDonald
(74) *Attorney, Agent, or Firm* — The Law Office of Joseph L. Felber

(57) ABSTRACT

A system and apparatus for Computer Numerically Controlled (CNC) machines wherein a workpiece is maneuvered about a working surface.

6 Claims, 12 Drawing Sheets

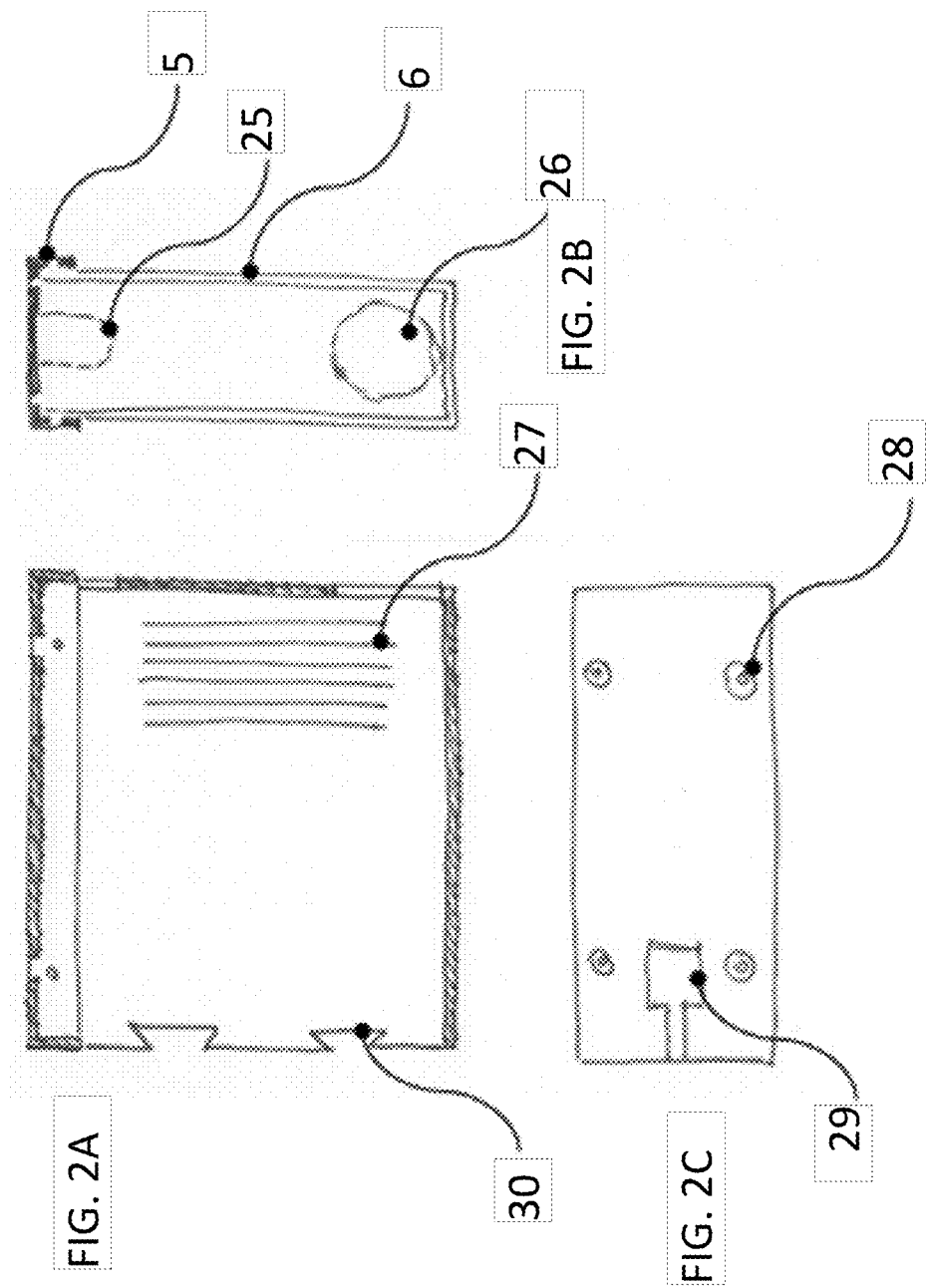

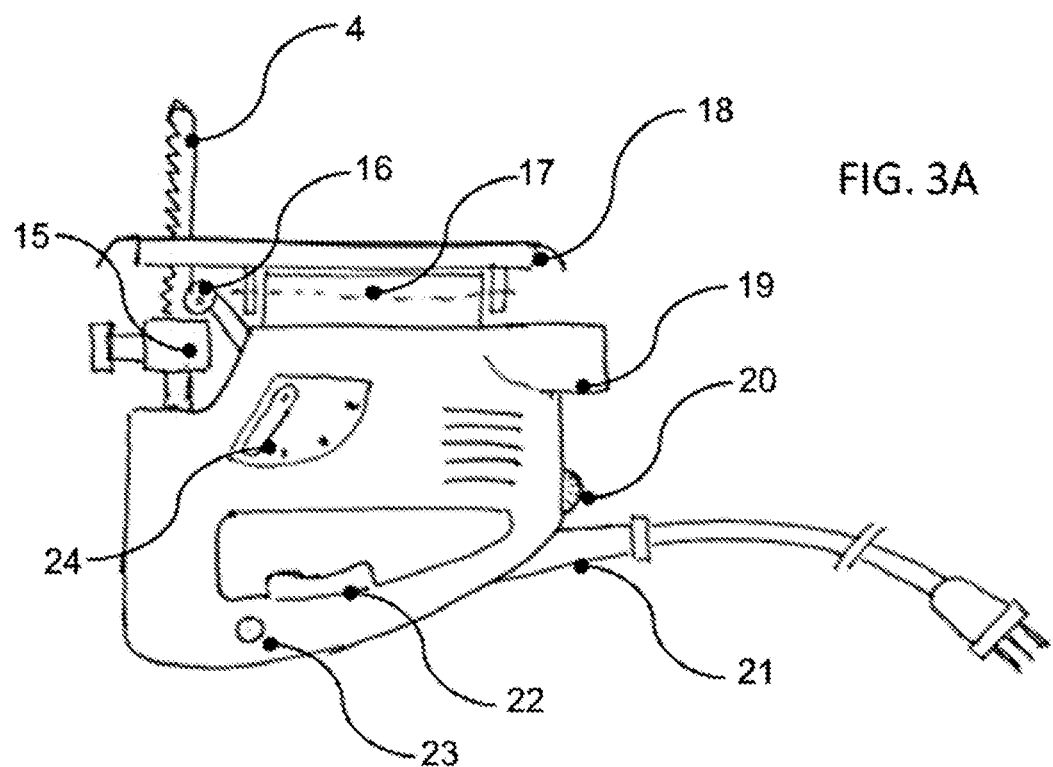
FIG. 3A
FIG. 3B
FIG. 3C
FIG. 3D
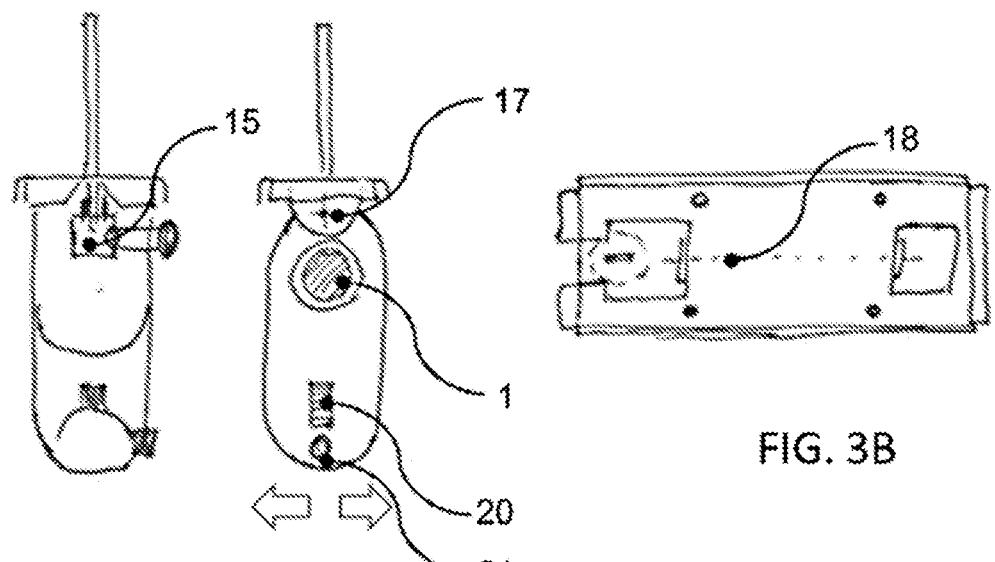

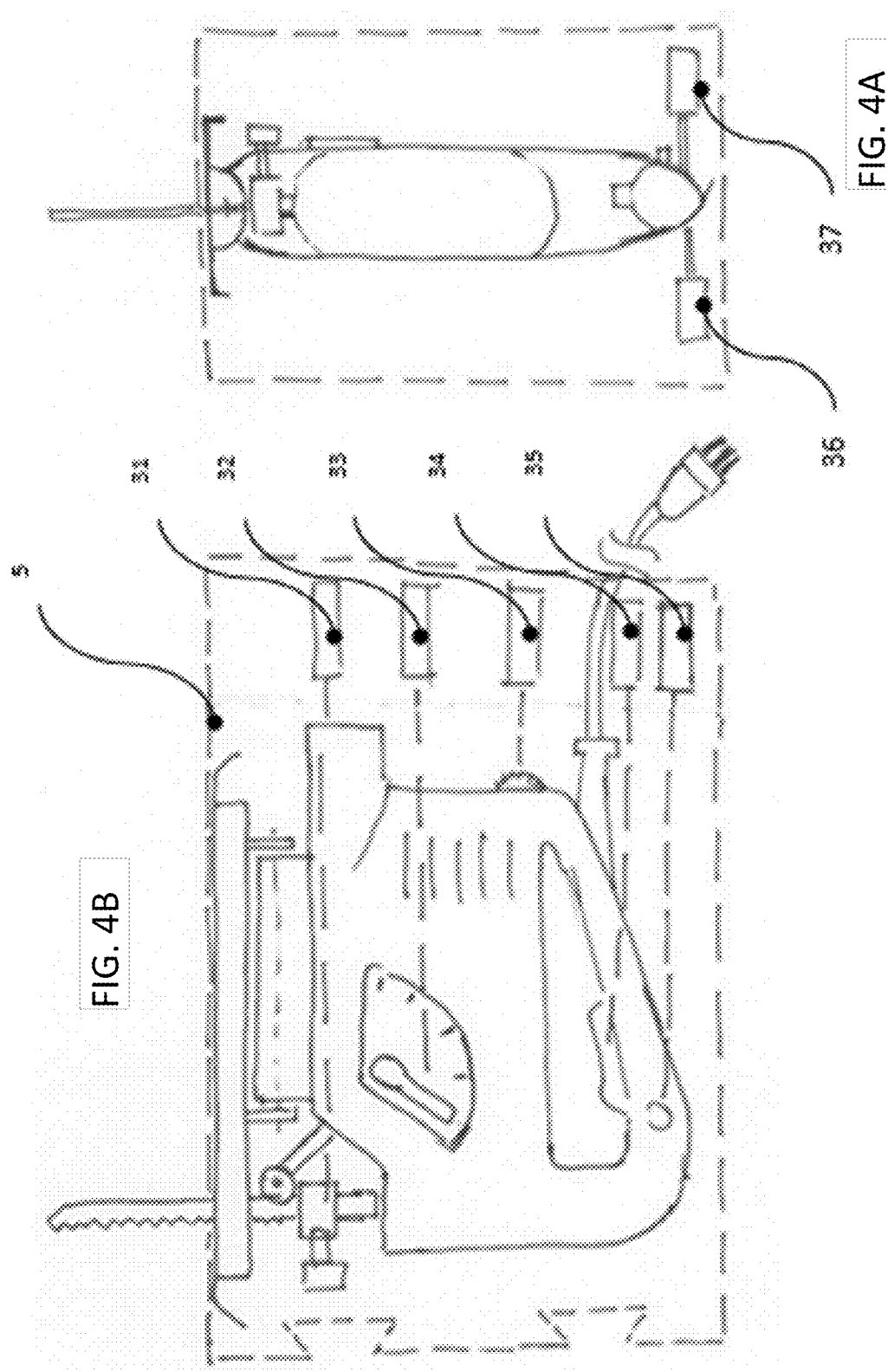

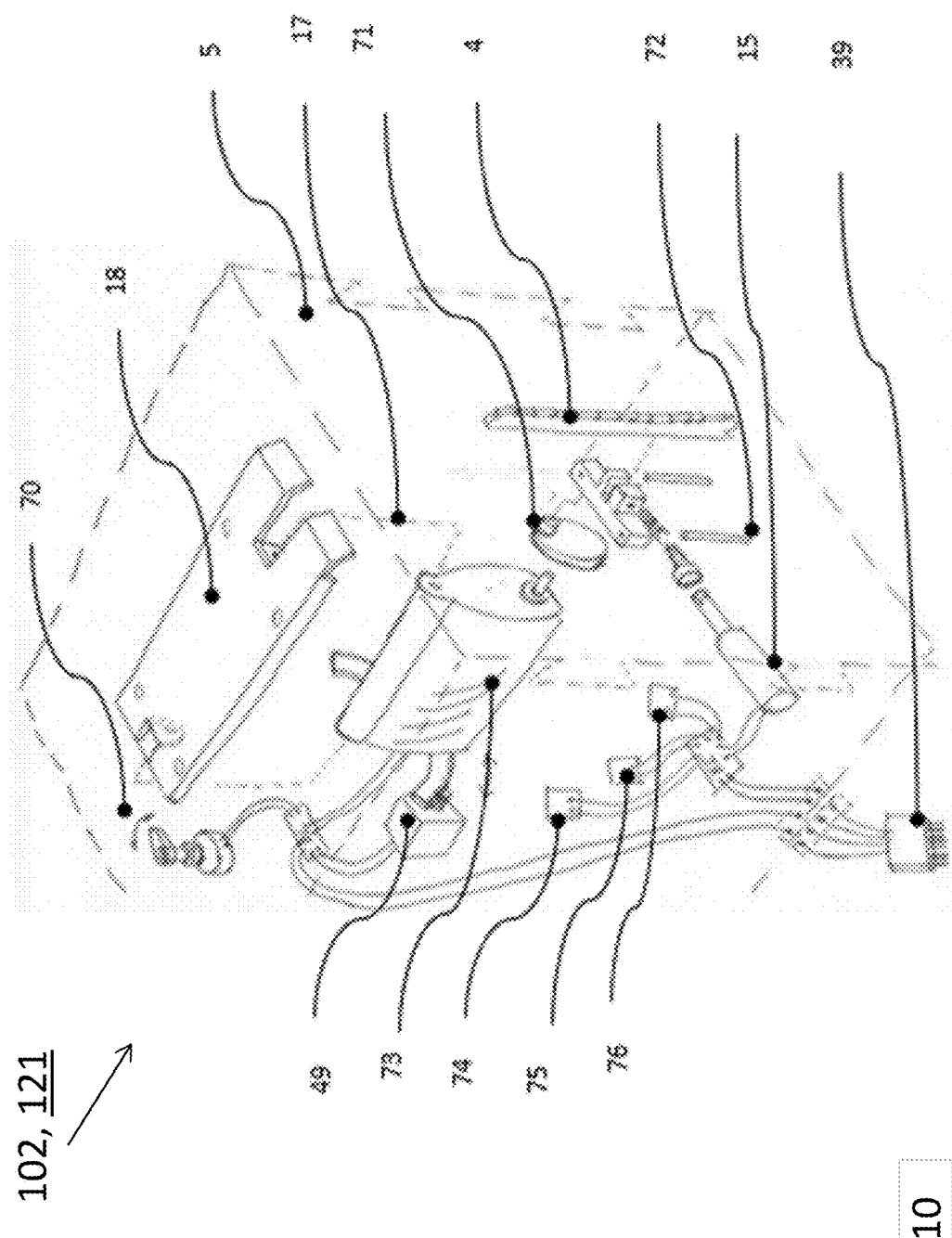

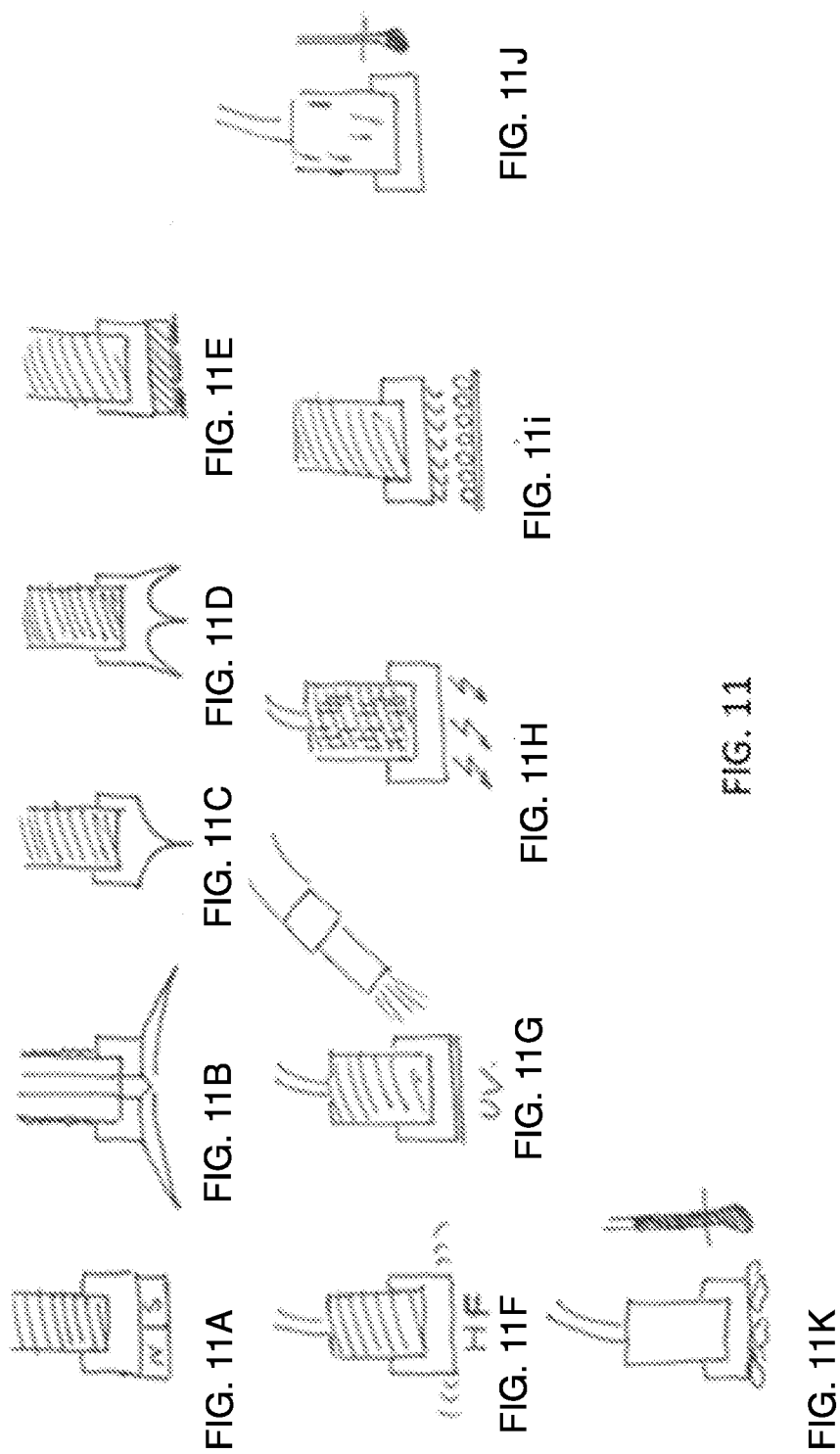

CNC SYSTEM AND APPARATUS

FIELD OF THE INVENTION

The present invention relates to a system and apparatus for Computer Numerically Controlled (CNC) machines and in particular, to such a CNC system and apparatus wherein a workpiece is maneuvered about a working surface.

BACKGROUND OF THE INVENTION

Computer numerically controlled (CNC) machines and tables are frequently used to manufacture items that require machining processes to be used. A coordinate system (X,Y, Z) is used to program the CNC machine for the machining process and the center of the coordinate system is associated with a center point for a table of the CNC machine.

State of the art CNC tables comprise an X-Y table with a centralized tool that is maneuvered over a given working area. The tool is maneuvered about the working area to perform the necessary machining and/or job of a workpiece and/or a raw material. The tool used by the CNC table is changed as is necessary according to the job required.

State of the are CNC tables also utilize various clamping means such as mechanical clamping, vacuum clamping, to affix the workpiece and/or raw material within and around the working area of the CNC table. Such clamping is provided so as to control and to provide accurate machining of the raw material. In that way the tool is moved around to machine a stationary workpiece.

SUMMARY OF THE INVENTION

The present invention overcomes the deficiencies of the background by providing a CNC system and apparatus where the machining workpiece and/or substrate is maneuverable about a CNC working surface featuring at least one or more tooling stations. Accordingly, there is an unmet need for, and it would be highly useful to have, a CNC system and device in the form of a CNC table where a substrate is mobilized along an X-Y table working surface to a plurality of stationary optional CNC tool(s).

In embodiments of the present invention provide a CNC table and system and associated device that provides a system where the various CNC tools are stationary about the X-Y table forming the CNC system and wherein the workpiece is maneuvered between the different tooling stations.

In embodiments of the present invention the CNC table features dedicated tools that may be associated and/or secured along the periphery of the CNC table.

In embodiment of the present invention provide a device for adapting and/or converting state of the art off the shelf hand manipulated power tools to form a tooling stations capable of use with the CNC system according to the present invention.

Within the context of this application the term "off the shelf tool" refers to any tool that is readily and/or commonly available tools for purchase from a store, or place of business therein as is commonly available in the marketplace. For example such tools may for example include but is not limited to jigsaw, drill, lathe, brush, chisel, saw, nibbling tool, etching, knife, saw, band saw, tiltable band saw; sanding tool, circular saw, belt sander, reciprocal sanding tool, motor the like or any combination thereof, that are available for purchase in a ready to use form from a marketplace vendor.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 2A-C shows various views of a schematic illustrative diagram of an exemplary encapsulation device according to the present invention;

FIG. 3A-D show various view of an off the shelf hand held power tool and encapsulated tool assembly formed therewith so as to adapt the power tool for use with system 100;

FIG. 4A-B show various view of an off the shelf hand held power tool and encapsulated tool assembly formed therewith so as to adapt the power tool for use with system 100;

FIG. 10 show a view of an off the shelf hand held power tool encapsulation housing with a plurality of actuators according to optional embodiments of the present invention; and FIG. 11, 11A-11K are schematic illustrative diagrams of optional coupling means utilized with an exemplary embodiment of system according to the present invention.

DESCRIPTION OF THE PREFERRED EMBODIMENTS

The principles and operation of the present invention may be better understood with reference to the drawings and the accompanying description.

The following figure reference labels are used throughout the description to refer to similarly functioning components are used throughout the specification hereinbelow.

Figure 1A:
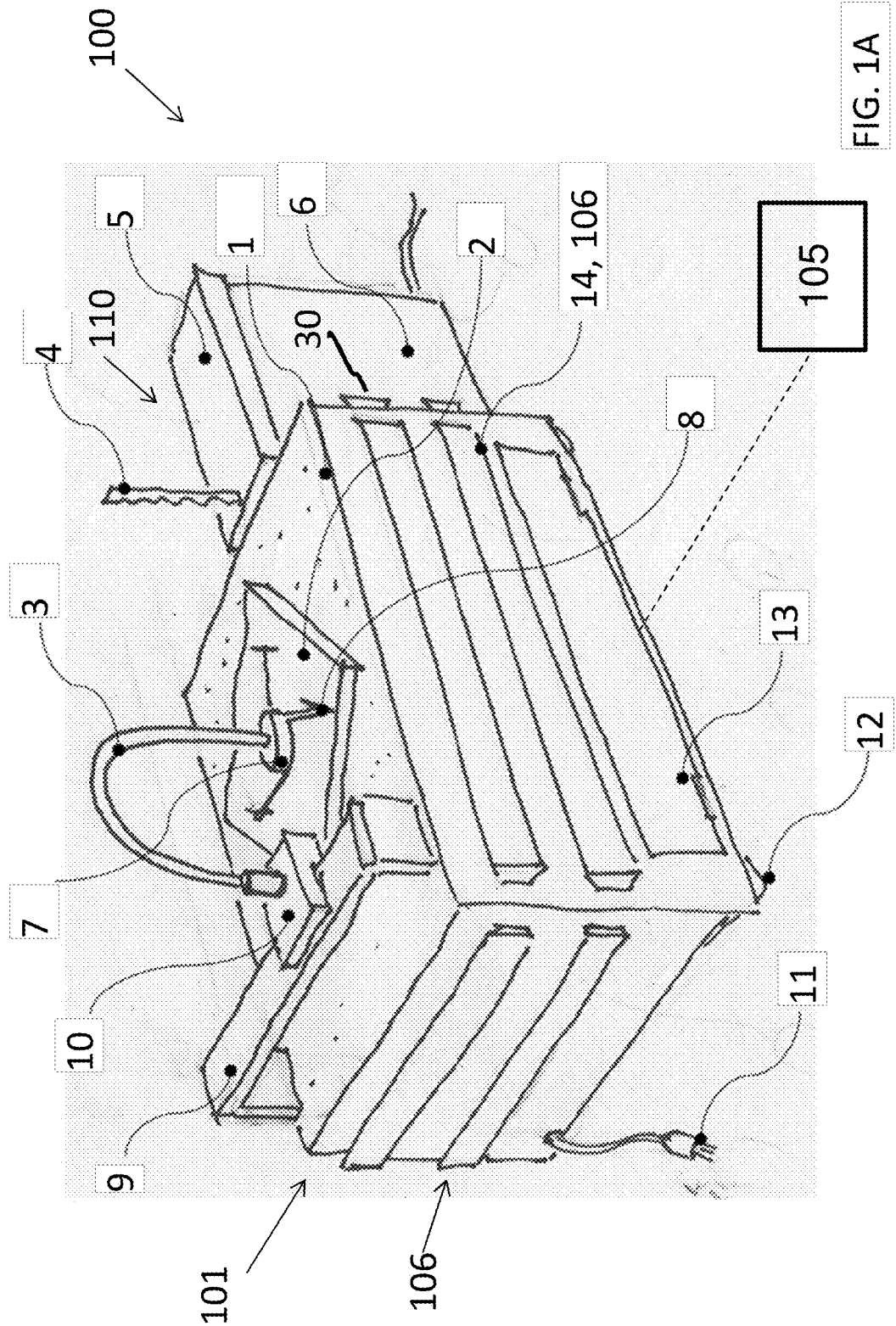
FIG. 1A-C are schematic illustrative diagrams of an exemplary system according to the present invention.
Figure 1B:
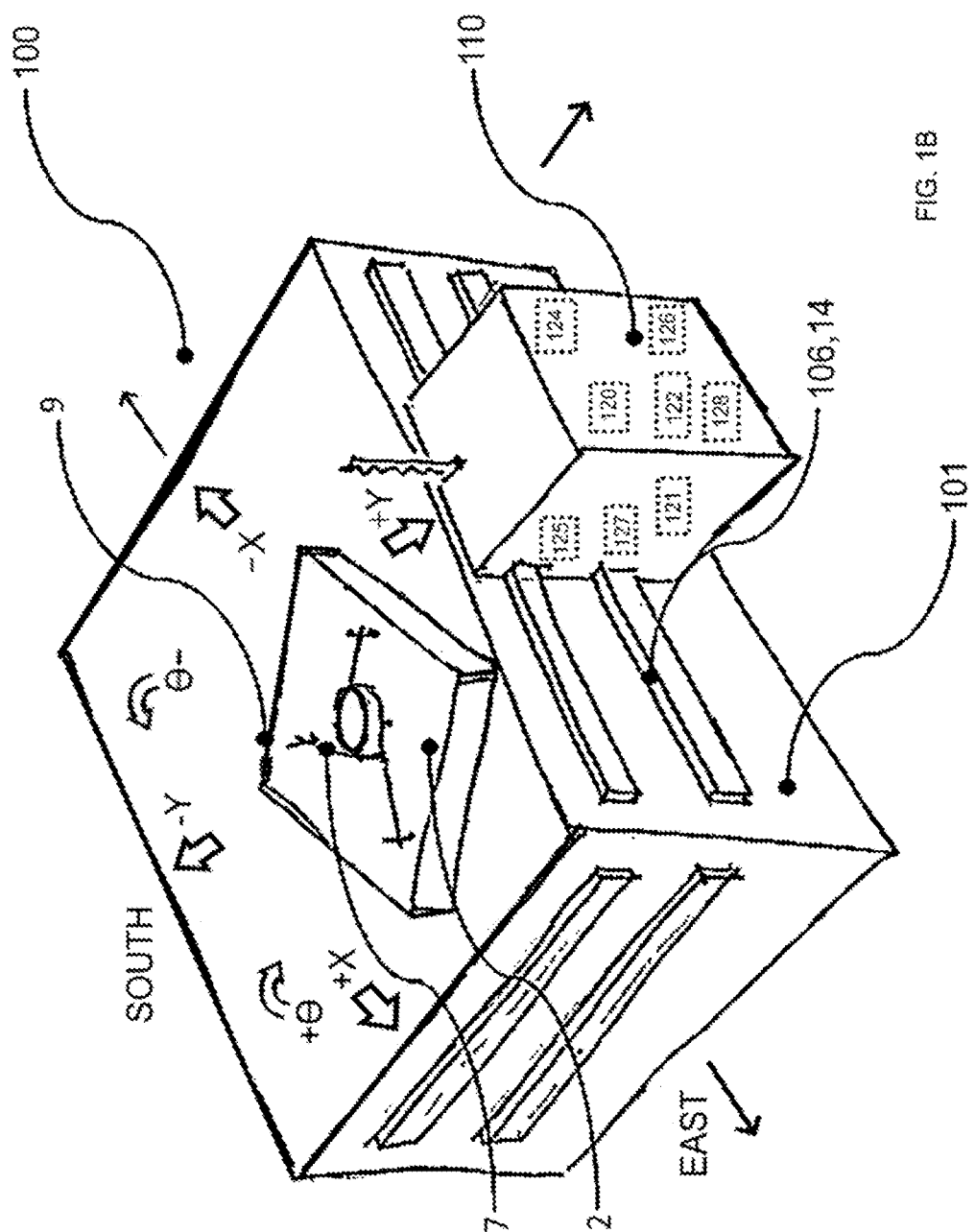
Figure 1C:
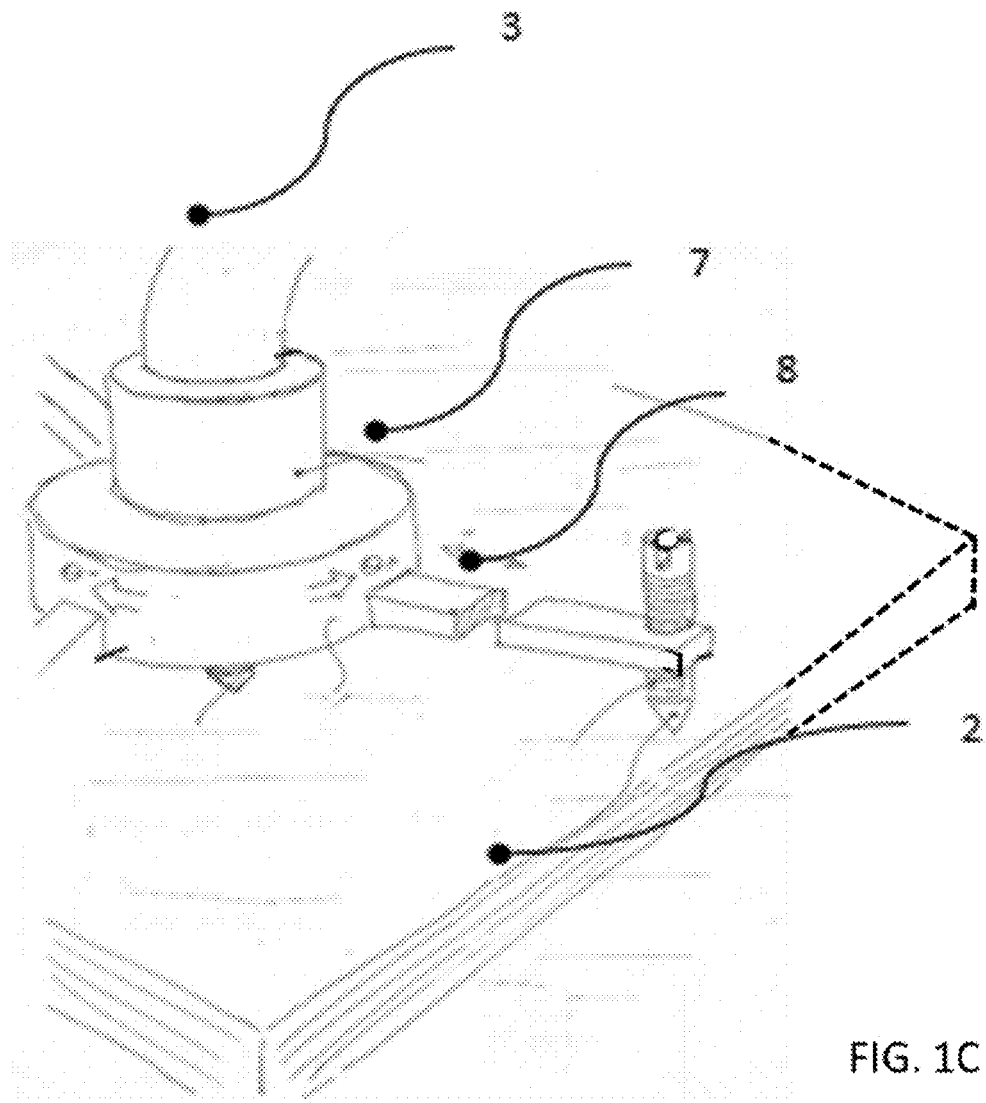

1 working surface;
2 substrate/raw material/workpiece;
3 movement arm;
4 tool assembly;
5 capsule cover;
6 capsule body;
7 arm holding point;
8 arm holding point;
9 guide;
10 movement module;
11 power supply;
12 wheels;
13 additional tools storage;
14 tool rail;
10 raw material;
100 system;
101 CNC X-Y table;
102 capsule housing;
104 off the shelf tool;
105 control module;
106 tool holding rail;
110 tool assembly;
112 jig saw;
114 drill;
120 control module;
121 actuation module;
122 power module;
124 electronics and circuitry module;
125 positioning module;
126 communication module;
127 safety module;
128 diagnostics module;

Referring now to the drawings, FIG. 1A-C show a schematic illustration of system 100 for a CNC table according to the present invention. The system comprising a X-Y table 101 and at least one or more tool assembly 110.

Table 101 comprises a working area 1 for maneuvering a workpiece and/or raw material and/or substrate 2 in the: X, Y, Z and theta directions. Maneuvering and working of substrate 2 along area 1 is provided with X-Y table and movement arm 3 disposed on a guide 9 and a controllable movement module 10. Preferably guide 9 and movement module 10 provides arm 3 with maneuverability and/or movement in the X, Y and Z directions. FIG. 1B shows the different movement t of table 101 with arm 3 removed.

In embodiments, an end of arm 3, as shown in FIG. 1C, is further fit with a rotating movement module 7 that provides for maneuverability and/or movement of the substrate 2 in the rotational and/or theta direction. Substrate 2 may be associated with and/or affixed and/or pinched to arm 3 over movement module 7 and a holding point 8.

In embodiments movement module 7 provides 360 degree rotation of substrate 2 along and across the entire session and/or working surface 1.

In some embodiments movement module 7 may utilize various coupling means to secure and/or pinch substrate 2 to arm 3, for example including but not limited to at least one or more of vacuum (FIG. 11-*b*), magnetic (FIG. 11-*a*), mechanical (FIG. 11-*d*, FIG. 11-*c*), electromagnetic (FIG. 11-*h*), electrostatic (FIG. 11-*h*), temporary adhesives (FIG. 11-*e*), adhesive (FIG. 11-*e*), light curing (FIG. 11-*g*), ultrasonic (FIG. 11-*h*), shortwave vibrations (FIG. 11-*h*), Velcro™ (FIG. 11-*i*), cryogenic (FIG. 11-*j*), melted wax (FIG. 11-*k*), hot glue (FIG. 11-*k*), thermoplastic adhesion (FIG. 11-*k*), any combination thereof or the like, for example as shown in FIG. 11.

In embodiments arm 3 and movement module 7 provide for positioning and holding substrate 2 is such a manner that substrate 2 is clamped along its body more preferably from above but optionally from below, however not along it side surfaces as is provided by state of the art CNC tables and systems.

Preferably rotating module 7 and holding point 8 serve as the point of contact between the device and substrate 2, preferably this is configured to allow the maximal grabbing force without damaging the material handled 2.

In embodiments holding point 8 may further comprise adjustable tips that are suited to accommodate any raw material and affirm it's adhesion when and as needed.

In embodiments working surface 1 may further comprise an airflow module (not shown) utilized to both ventilated and levitated working surface using airflow in order to reduce friction, allowing for efficient movement and manipulation of substrate 2. Similarly airflow module may be utilized to create a vacuum about working surface 1 so as to secure substrate 2 at a location where it is being machined.

Tool assembly 110, as shown in FIG. 1A-B, may be associated with system 100 along a rail 106 disposed along the outer perimeter of X-Y table 101. Tool assembly 110 comprises an encapsulation housing 102 and a tool 104. Preferably encapsulation housing comprises capsule body 6, capsule cover 5 and capsule couplers 30. Preferably capsule body 6 provides a housing for optional tools 104 to be used with system 100, in particular for housing a control and/or actuating portion of a tool for example a motor, levers or the like. Preferably capsule cover 5 provides an interface through which a tool's functional unit, for example including but not limited to a drill bit, a saw blade, a sanding surface, sanding disc, or the like, protrude so as to come into contact with the substrate.

In embodiments capsule cover 5 may be height adjustable so that it may be adjusted to be flush with working surface 1. In some embodiments tool assembly 110 may be fit a capsule cover 5 configured to adjustable so as to ensure that it is flush with working surface 1. In some embodiments tool assembly 110 may be fit a capsule body 6 configured to have an adjustable height so as to ensure that capsule cover may be configured and/or adjusted to be flush with working surface 1.

In some embodiments tool assembly 110 may comprise at least one or more modules for example including but not limited to modules selected from: control module 120, power module 122, electronics and circuitry module 124, positioning module 125, communication module 126, diagnostics module 128, safety module 127, actuation module 121, or the like, that are configured to work to render tool assembly 110 functionally and controllable.

Control module 120 may be provided in the form of a microcontroller and/or CPU (central processing unit) that preferably provides for overall control of tool assembly and its additional modules. In some embodiments control module 120 is provided to be in communication with system control module 105. In some embodiments module 105 is configured to control tool assembly 110 via communication with control module 120.

Power module 122 provides a module for handling the power management and supply of tool assembly 110. Power module 122 may be configured to power and render tool assembly 110 functional with different forms of power sources. In some power module 122 is controlled and in communication with system 100 via control module 120. In some embodiments power module 122 may be in direct communication with system 100 via control module 105.

Electronics and circuitry module 124 preferably provides the necessary circuitry to render tool assembly 110 functional.

Positioning module 125 is preferably provided to determine the position of tool assembly 110 with respect to X-Y table 101 so allow for precise control and planning of how to maneuver substrate 2 relative to tool assembly 110. In some embodiments positioning module 125 is controlled and in communication with system 100 via control module 120. In some embodiments positioning module 125 may be in direct communication with system 100 via control module 105.

In embodiments communication module 126 preferably provides control module 120 with communication capabilities with system control module 105. Communication module may be provided with any communication protocols as is known in the art. In some embodiments communication module 126 may be in direct communication with system 100 via control module 105. In embodiments communication module may comprise communication capabilities via network and/or a server capable of communicating with one another via the internet and/or internet communication protocols.

In embodiments at least two or more tool assemblies 110 may be in communication with one another via a network server for example the internet and/or an intranet utilizing appropriate communication protocols.

In embodiments at least one or more tool assembly 110 may be in communication with controller module 105 via a network server for example the internet and/or an intranet utilizing appropriate communication protocols.

In embodiments a tool assembly 110 may feature a communication module 126 capable of communicating via cloud computing and/or utilizing an internet connection and/or an internet communication protocol.

In embodiments diagnostics module 128 preferably provides for diagnosing, sensing and monitoring the function of tool assembly 110. In some embodiments diagnostics module 128 is controlled and in communication with system 100 via control module 120. In some embodiments diagnostics module 128 may be in direct communication with system 100 via control module 105.

In embodiments safety module 127 preferably provides for monitoring safe use and function of tool assembly 110. In some embodiments safety module 127 is controlled and in communication with system 100 via control module 120. In some embodiments safety module 127 may be in direct communication with system 100 via control module 105.

In embodiments actuation module 121 provides for actuating the tool assembly 110 to render its action. Preferably actuation module comprises at least one or more actuators in optional forms, for example in the form of a motor, spring, pulley, to render a functional tool of tool assembly 110. Preferably actuating module 121 is controlled with control module 120. In some embodiments actuating module 121 may be controlled and in communication with system 100 via control module 120. In some embodiments actuating module 121 may be in direct communication with system 100 via control module 105.

In some embodiments tool assembly 110 may comprise an actuating module 121 that provide for rendering and/or converting an off the shelf power-tool such as a jigsaw (FIG. 3) or drill (FIG. 4) to form a CNC tool that may be utilized with table 101 and system 100. In some embodiments tool assembly 110 may therefore comprise a plurality of actuators to facilitate rendering an off the shelf power-tool a CNC dedicated tool for use with system 100 and in particular with table 101.

In some embodiments working surface 1 may comprise a recess (not shown) along the inner surface of surface 1 configured to be capable of receiving an optional tool assembly 110.

System 100 comprises a control module 105 comprising both electronics module (not shown) and software module (not shown) provided to render system 100 operational. Preferably control module 105 comprising electronics module and software module provide the necessary power circuit, circuitry, hardware, wiring, communication, electronics and software to render system 100, X-Y table 101, and its associated tool assembly 110 functional. In embodiments control module 105 may be wired or wirelessly with system 100 and/or table 101. For example, software module may provide the necessary control in order to manipulate movement module 10, rotational module 7, arm 3 and tools assembly 110. Preferably software module provides for determining the job necessary according to such location and properties of at least one or more of substrate 2 and/or encapsulated tools 110, as well as other parameters involved.

Preferably control module 105 allows for setting and/or determining all setting and configuration of system 100. For example, module 105 provides for setting the location of the tool where it is registered in the software module and the calculated all parameters relating to the expected job and toolpath for example including but not limited to location, tool parameters, raw material type, feed rates, the like or any combination thereof.

System 100 preferably provides for manipulating a substrate to provide for the formation of a multidimensional object for example 2D, 2.5D, 3D, 4D and 5D parts.

In some embodiments the inner volume formed under table 101 in particular underneath working surface 1 may be utilized as a storage area 13 for example for storing additional tools. For example additional storage area 13 may be provided in the form of a drawer, as shown.

In some embodiments system 100 may further comprise wheels and cushions 12 are used to assist the transportation and to secure table 101 to the floor so as prevent the slippage of system 100 during use.

FIG. 2 show a depiction of capsule housing 102 comprising a capsule lid 5 and a body 6. Encapsulation housing 102 provides for receiving an off the shelf tool 104 within housing body 6, therein facilitating conversion of an off the shelf hand held power tool 104, to a system specific CNC tool.

FIG. 2A-C illustrates a hand tool capsule 102 according to embodiments of the present invention comprising, the hand tool capsule 102 comprising a capsule body 6 and a capsule lid 5. Capsule body 6 is provided with a plurality of actuators and hardware are arranged in order to allow automation and control of off the shelf tools 104 disposed therein.

In embodiments capsule 102 provides an interface for off the shelf tools 104 to be adapted to a CNC tool assembly 110 configured to be utilized table 101 of system 100.

In embodiments a portion of off the shelf tool 104, for example a jigsaw plate 18, is configured to be attached to a corresponding coupling member 28 disposed along a portion of tool capsule 102, more preferably lid 5. For example, plate member 28 as shown corresponds to the jigsaw's plate 18, shown in FIG. 3. As shown plate member 28 may further feature an access port 29 for example in the form of recess 29 provided to allow tool 104 to assume variable angles. For example, recess 29 is provided to allow for blade replacement in a jig saw. More preferably recess 29 is provided along capsule lid 5.

Preferably tool capsule 102 is further provided with any number of openings and/or recesses, as is necessary, to allow for properly receiving a tool 104 and/or to properly align with the tool 104. For example, as shown capsule body 6 comprises a plurality of openings 25, 26 and 27 that are provided to respectively allow capsule 102 to receive portions of tool 104 such as cables 25 and/or to provide ventilation 27 and/or to provide exhaust and other elements to communicate outside the capsule.

The capsule 102 further features coupling members 30 provided for safely and securely associating with system 100 most preferably along rails 14,106. In some embodiments coupling members 30 allow capsule 102 to slide and attached to the tool assembly 110 including tool capsule 102 associated with tool 104 to system 100.

Preferably by attaching tool assembly 110 over rails 14,106 the periphery of the device and the substrate 2 are manipulated and operated. This reduces was and provides for utilizing the edge Referring now to FIG. 3A-D show an off the shelf power hand tool 104 in that may be encapsulated to form a tool assembly 110 for use with system 100 with table 101, according to embodiments of the present invention. FIG. 3A-D illustrates an example of an off the shelf commercially available jigsaw 112.

As an example, jigsaw 112 has many designed features all to serve manual operation that may be adapted to be used with system 100 by encapsulating it with capsule 102 to form a tool assembly 110.

The tool 112 is designed to allow the blade 4 to manipulate raw material 2 in the most accurate and safe manner.

In such tool, many elements serve as assistants such as the back pulley 16, the blade ejector 15, the pendel lever 24, the speed adjuster 20, the locking knob 23, the soft starting trigger 22 and the rotation axis 17. An exhaust outlet 19 is provided in order to evacuate debris while working. Additionally a sliding surface 18 provides the interface of the jigsaw the surface to be cut. Sliding surface 18 is configured and placed so as to resists all the pounding and the motion of the jigsaw.

Preferably all such features and/or actions are adapted by introducing a plurality of actuators within capsule body 6 so as to maintain full functionality of each of the functions provided by jigsaw 112.

FIG. 4A-B illustrates various views of an encapsulated tool assembly 110 with a tool 104 shown in the form of a jigsaw hand-tool 112 disposed internal to capsule 102. Accordingly FIG. 4 shows a non-limiting example of the marriage between tool 104, specifically jigsaw 112, and the capsule 102 that form tool assembly 110.

In order to remotely operate and control hand tools 104 with tool assembly 110, capsule 102 is fit with at least one or more actuator that are placed and configured to correspond to at least one or more of the intended use and/or functions and/or actions performed by tool 104.

A non-limiting example of such actuators is depicted in FIG. 4 in the form of exhaust 31; pendel action 32, variable speed control 33, starting trigger 34, locking knob 35, and angular tilting mechanism 36 and 37. Electronic control is provided using communication protocols as is known in the art. Furthermore electronic circuitry may be utilized in order to facilitate energy management and control of tool 104 and in particular of system 100.

Figure 5:
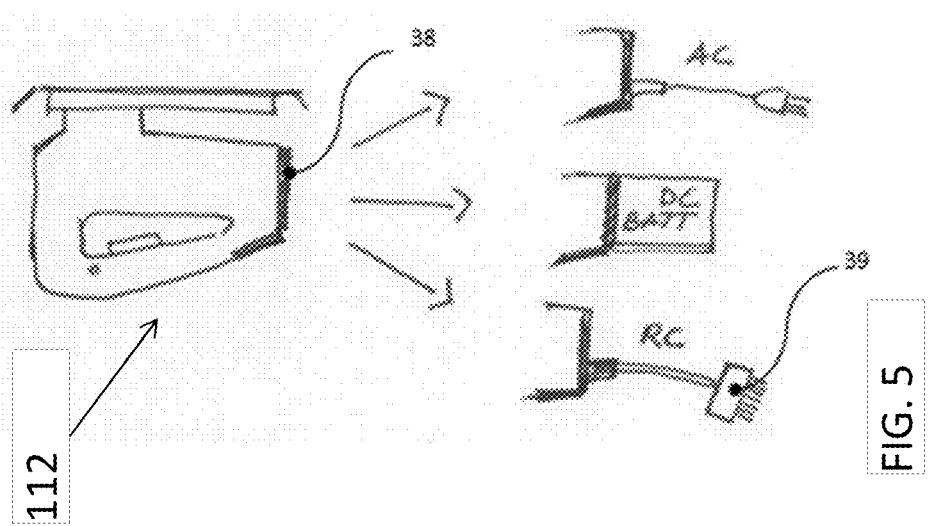
FIG. 5 shows an off the shelf hand held power tool that may be encapsulated with the tool assembly according to embodiments of the present invention.

Reference is now made to FIG. 5 which illustrates different methods of power management of tool assembly 110 wherein tool 104 is provided with power within capsule 102 for example with control and power module 39 that may be provided in optional forms for example including but not limited to Alternating current (AC), Battery operation (DC), and Remote control plug (RC), the like, or any combination thereof. Preferably control and power module 39 provides for remotely controlling and powering an encapsulated tool 104 as is necessary.

In some embodiments power module 39 may be incorporated with capsule 102. In some embodiments power module 39 may be provided as an add-on device for capsule 102 that provides for interfacing between power module 39 and tool 104, shown in the form of jigsaw 112. In some embodiments module 39 may be provided as a multi-portion module wherein a first portions is associated with tool 104 and a second portion is provided with capsule 102.

In some embodiment module 39 may further comprise a communication module to allow for wired and/or wireless communication and it establishes a bi-directional communication between the encapsulated tools assembly 110 and the system 100.

Figure 6:
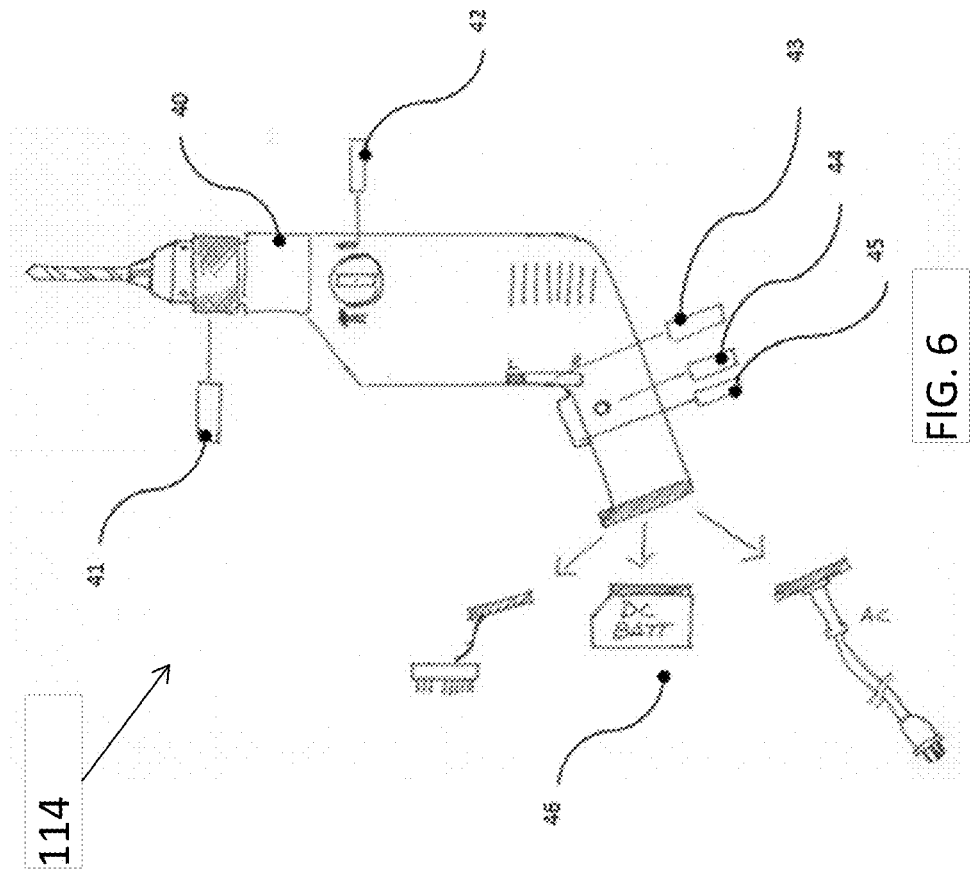
FIG. 6 shows an off the shelf hand held power tool that may be encapsulated with the tool assembly according to embodiments of the present invention.
Figure 7:
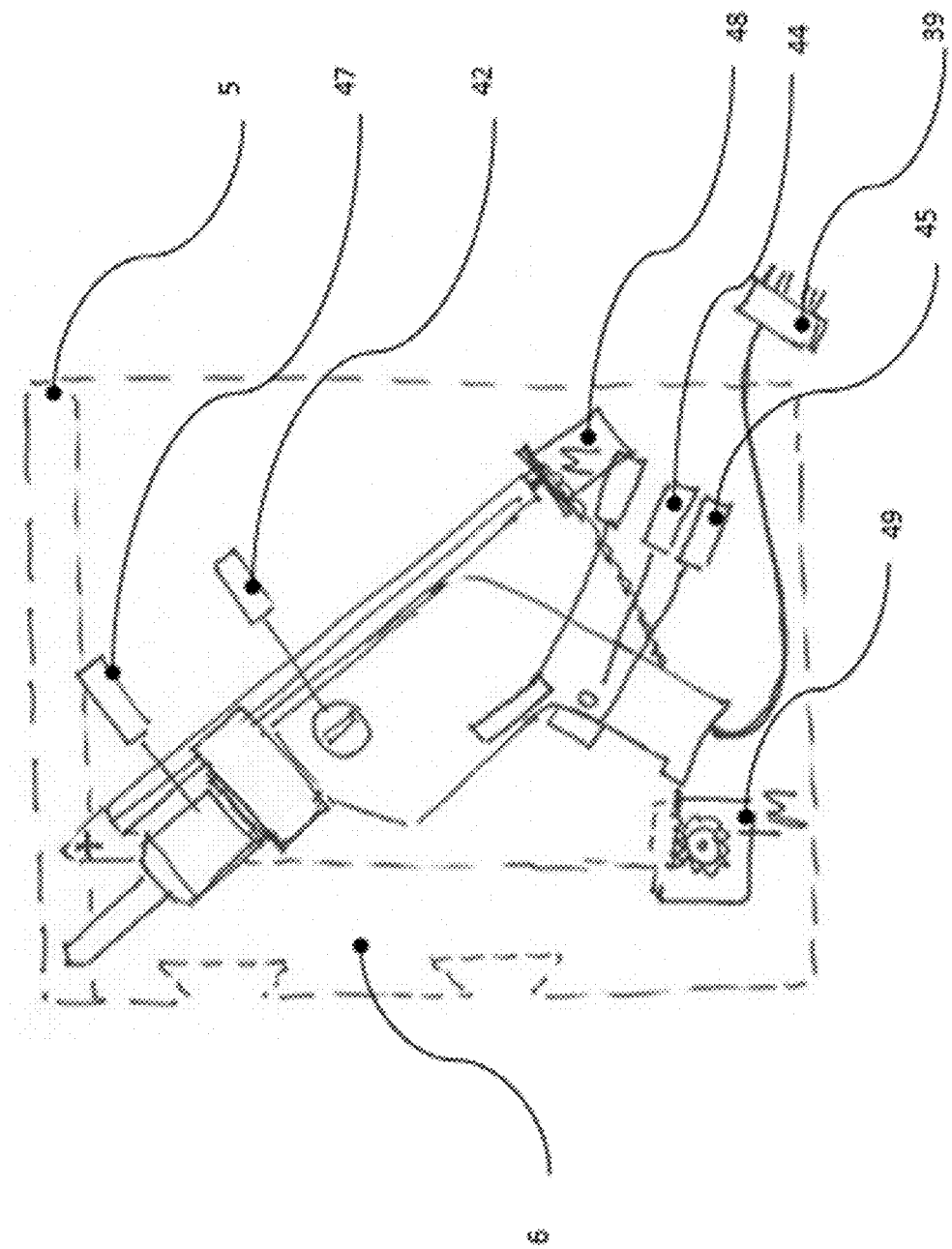
FIG. 7 shows an encapsulation of the power tool shown in FIG. 6 according to embodiments of the present invention.

Reference is now made to FIG. 6-7 which illustrates another commonly used hand-tool 104 in the form of a power drill 114 that may be encapsulated according to embodiments of the present invention so as to allow its use with system 100.

Drill 114 has a plurality of controllable actions that may be controlled remotely within capsule 102 for example including but not limited to: collar interface 40; drill type selector hammering or drilling 42; drill locking and clutching 41; drill direction selector 43 for selecting forward clockwise (CW) or reverse counterclockwise (CCW) drill direction; locking button 44; soft starting trigger 45 and power supply 46.

Embodiments of the present invention provide a capsule 102 comprising a plurality of actuators to account for all essential actions of a power hand-tool 104 such as drill 114, as described above, so as to facilitate automation with system 100. Capsule 102 further comprises a control and power module 39 to ensure appropriate communication and control of the associated tool 104.

FIG. 7 shows drill 114 in its encapsulated form wherein drill 114 is fit within capsule 104 to form tool assembly 110 in the form of a drill. Tool assembly includes a plurality of actuators to account for all of the native actions of the drill so as to allow all the degrees of motion and functions of a stand-alone drill. Most preferably encapsulation tool assembly 110 allows for remotely and accurately controlling drill 114 with system 100.

In some embodiments encapsulation actuators are carriable while others some are binary.

In some embodiments capsule 102 may further comprise an actuator to provide additional range of motion for the encapsulated tool 104. For example, capsule 102 provided for drill 114 may further comprise a motorized tilting mechanism 49 to provided tool assembly 110 comprising drill 114 with an add angular approach. Similarly a motorized linear actuator 48 may be provided with capsule 102 to provide encapsulated tool assembly 110 to allow for manipulating drill 114 to control the approximation and depth of drill 114.

Figure 8:
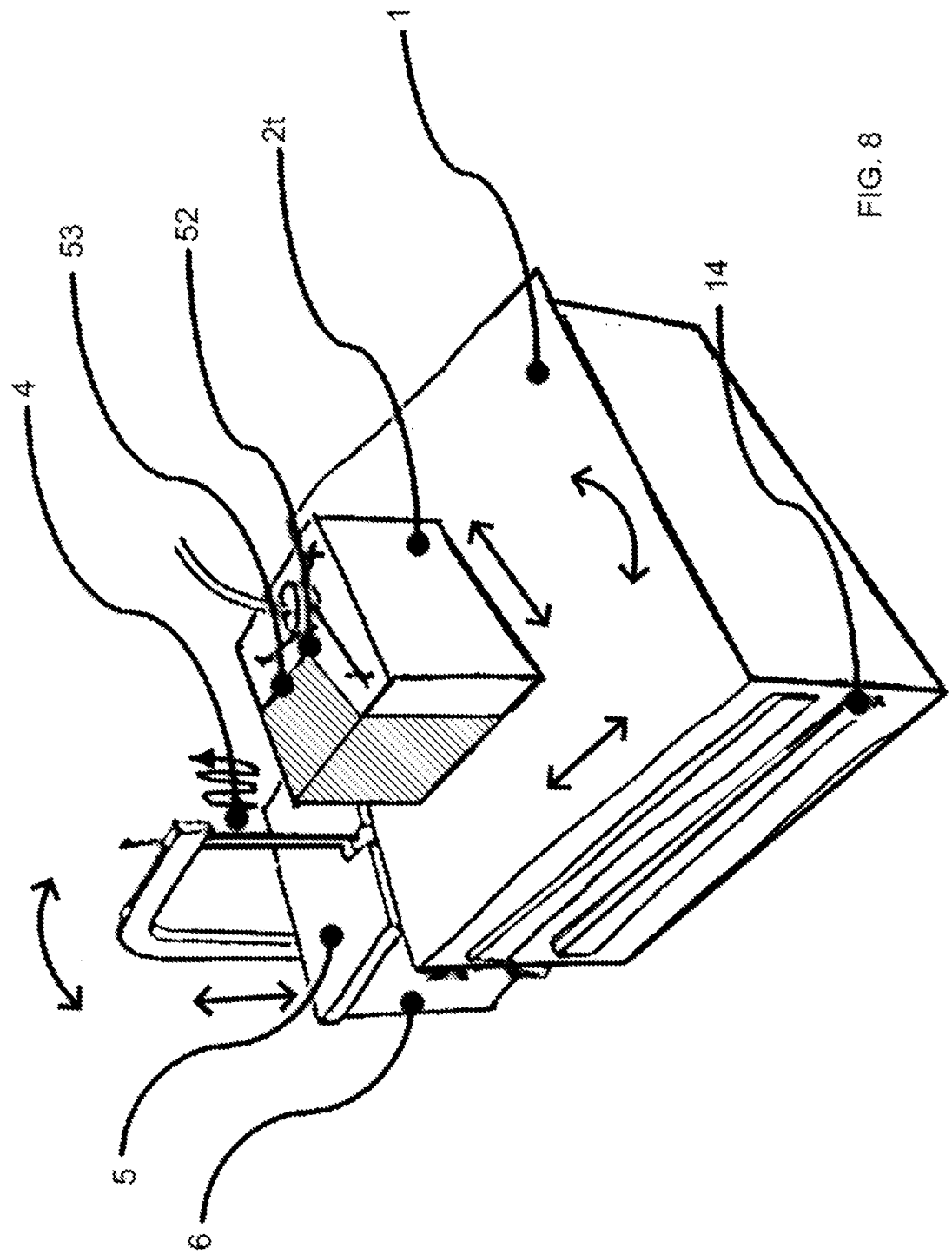
FIG. 8 shows an additional schematic illustrative diagram of an exemplary system according to the present invention.

Reference is made to FIG. 8 which illustrates a substrate 2t having a tall and/or large vertical dimensions therefore numbered. Such tall substrates cannot be manipulated and/or worked with current state of the are CNC tables and/or machines which requires manual manipulation.

Embodiments of system 100 provide for working a tall substrate 2t such as that schematically depicted. Generally such a tall substrate may be cut in several sections of different shapes and size or either carved along any desired path using manual or software guidance, with the system 100 according to embodiments of the present invention. Cutting raw material to size and/or to shape is always a need for any industry and process. By using system 100 substrate 2t is assured that: material is saved and re utilized due to cutting instead of milling away unnecessary material, inner sharp corners are achieved using sharp blades 52, straight or curved paths 53 are achieved by computerized control of the device.

Figure 9:
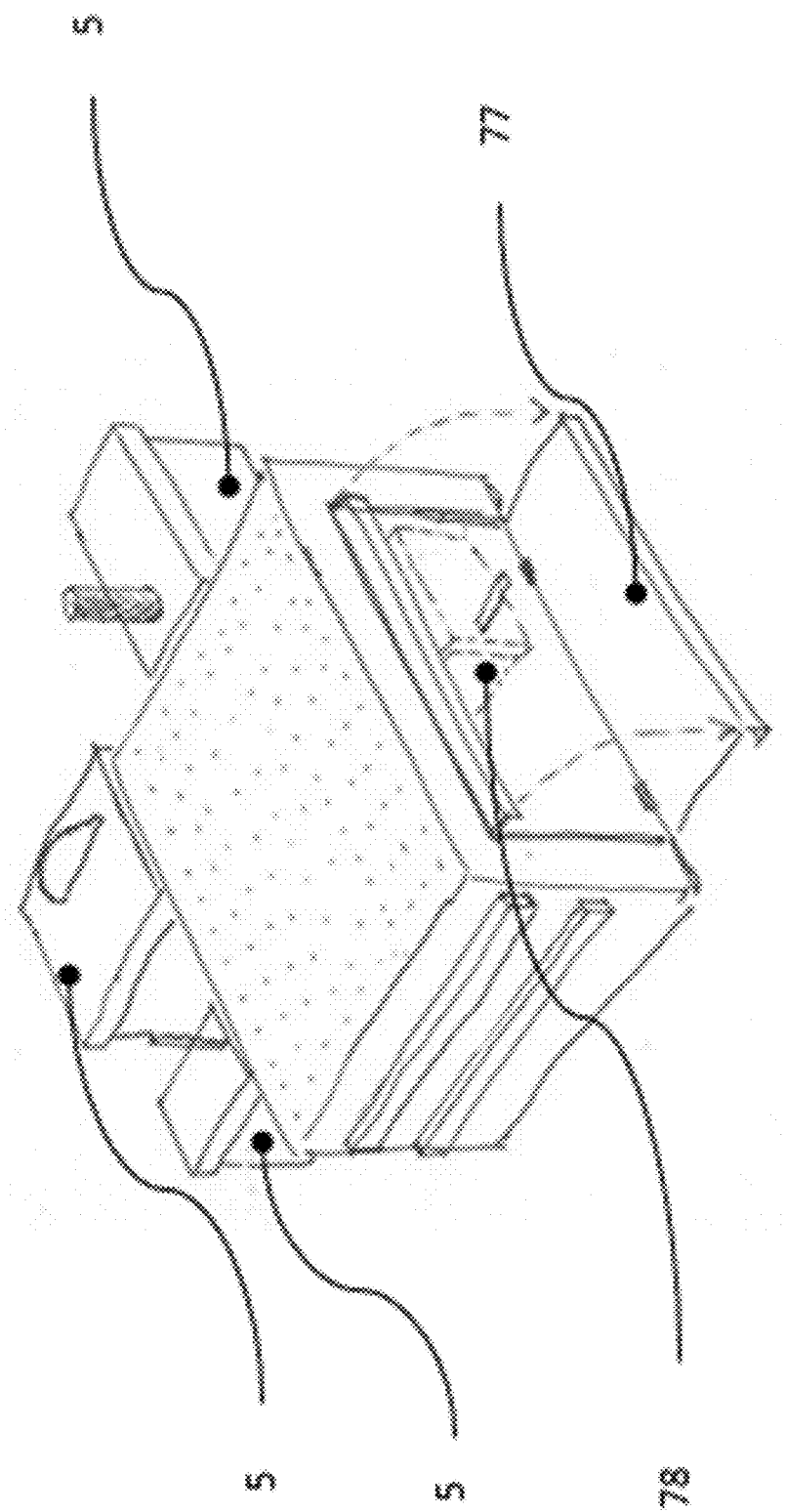
FIG. 9 shows an additional schematic illustrative diagram of an exemplary system according to the present invention.

Reference is now made to FIG. 9 showing a schematic illustration of system 100 wherein a plurality of tool assembly 110 are utilized simultaneously in various orientations, as shown. A number of encapsulated tools 5 are attached along the periphery of table 101 and an additional tool assembly 78 is shown in a storage compartment in the volume under work surface 1 of table 101.

In embodiments any tools may be adapted and/or encapsulated to form a tool assembly 110 according to the present invention and may be utilized with system 100. Accordingly embodiments of the present invention may for example include but are not limited to encapsulate any one or more of the tools selected from: jigsaw, drill, lathe, brush, chisel, saw, nibbling tool, etching, knife, saw, band saw, tiltable band saw; sanding tool, circular saw, belt sander, reciprocal sanding tool, the like or any combination thereof.

In embodiments, tool assembly 110 and in particular encapsulation housing may further comprise at least one or more sensors to control and monitor the action of the encapsulated tool. For example, sensors inside alerts for any physical event such as overheat, blade broke or warp, faulty noises and general failures as well.

FIG. 10 shows an optional encapsulation housing 102 having a plurality of optional actuators forming an actuating module 121 so as to provide the optional functions of tool 104 (not shown). Actuating module 121 may be configured to function with a dedicated tool or it may be configured to function with an off the shelf power tool.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It should be noted that where reference numerals appear in the claims, such numerals are included solely or the purpose of improving the intelligibility of the claims and are no way limiting on the scope of the claims.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Citation or identification of any reference in this application shall not be construed as an admission that such reference is available as prior art to the invention.

Section headings are used herein to ease understanding of the specification and should not be construed as necessarily limiting.

While the invention has been described with respect to a limited number of embodiments, it will be appreciated that many variations, modifications and other applications of the invention may be made.

What is claimed is:

1. A CNC system for working a substrate with selected tools, the system including a control module, X-Y table and a maneuverable arm and at least one tool assembly;
    a) the X-Y table defining a working surface area the table featuring an assembly comprising: a movement module and a guide member that jointly provide movement in the X plane and Y plane; said guide having at least one dimension that is at least equal to one dimension of the working surface and wherein said movement module is configured to move along said guide member; and the X-Y table featuring a tool assembly coupling rail;
    b) the maneuverable arm having a first end coupled to the movement module and a second end featuring a rotation module configured to receive the substrate, wherein a rotatable arm provides movement in the Z plane and rotational movement of up to 360 degrees of the work with the X-Y table maneuverable along a working surface, the arm coupled to secure the substrate;
    c) the tool assembly coupled to the tool coupling rail disposed along a perimeter of the X-Y table; the tool assembly including a tool encapsulation housing and a tool disposed therein.

2. The system of claim 1 further comprising an airflow module providing levitating airflow or vacuum about the working surface of the X-Y table.

3. The system of claim 1 wherein said rotation module further comprises a vacuum holding module.

4. The system of claim 1 wherein the tool encapsulation housing comprises a plurality of actuators provided to control tool disposed therein.

5. The system of claim 1 wherein the tool is an off the shelf power-tool.

6. The system of claim 5 wherein the off the shelf tool is selected from one of:
    jigsaw, drill, lathe, brush, chisel, saw, nibbling tool, etching, knife, saw, band saw, tiltable band saw; sanding tool, circular saw, belt sander, reciprocal sanding tool.

* * * * *